(12) United States Patent
Itoi

(10) Patent No.: US 9,120,353 B2
(45) Date of Patent: Sep. 1, 2015

(54) TIRE

(75) Inventor: Dyta Itoi, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 125 days.

(21) Appl. No.: 13/877,794

(22) PCT Filed: Oct. 4, 2011

(86) PCT No.: PCT/JP2011/072858
§ 371 (c)(1),
(2), (4) Date: Apr. 4, 2013

(87) PCT Pub. No.: WO2012/046724
PCT Pub. Date: Apr. 12, 2012

(65) Prior Publication Data
US 2013/0192732 A1    Aug. 1, 2013

(30) Foreign Application Priority Data

Oct. 5, 2010 (JP) ................................ 2010-225771

(51) Int. Cl.
*B60C 11/11* (2006.01)
*B60C 11/03* (2006.01)

(52) U.S. Cl.
CPC ......... *B60C 11/0304* (2013.04); *B60C 11/0302* (2013.04); *B60C 11/11* (2013.01); *B60C 2011/0374* (2013.04)

(58) Field of Classification Search
CPC  B60C 11/0302; B60C 11/0304; B60C 11/11; B60C 2011/0358; B60C 2011/0372; B60C 2011/0374
USPC .............................. 152/209.8, 209.18, 209.28; D12/525–532, 557–567, 592–603
See application file for complete search history.

(56) References Cited

U.S. PATENT DOCUMENTS

D341,346 S  * 11/1993  Himuro et al. ............... D12/565
D344,055 S  *  2/1994  Heinen ......................... D12/530

(Continued)

FOREIGN PATENT DOCUMENTS

DE    10 2008 037 497 A1    5/2010
JP         3-132403 A        6/1991

(Continued)

OTHER PUBLICATIONS

International Search Report of PCT/JP2011/072858 dated Dec. 27, 2011.

(Continued)

*Primary Examiner* — Eric Hug
(74) *Attorney, Agent, or Firm* — Sughrue Mion, PLLC

(57) ABSTRACT

An inclined groove (11) has a first inclined groove (101) and a second inclined groove (102). The first inclined groove (101) intersects a tire equator line (CL) and extends to one side (W1) outward in the tire width direction proceeding from the forward side (F) to the rearward side (B) in the rotation direction. The second inclined groove (102) intersects the tire equator line (CL) and the first inclined groove (101), and extends to the other side (W2) outward in the tire width direction proceeding from the forward side (F) in the rotation direction to the rearward side (B) in the rotation direction. The first inclined groove (101) and the second inclined groove (102) have forward side curved grooves (111), (121) located at the forward side (F) in the rotation direction, and rearward side curved grooves (112), (122) located at the rearward side (B) in the rotation direction.

8 Claims, 2 Drawing Sheets

(56) References Cited

U.S. PATENT DOCUMENTS

| | | | |
|---|---|---|---|
| D370,196 S * | 5/1996 | Graas et al. | D12/566 |
| D441,328 S * | 5/2001 | Heinen et al. | D12/558 |
| D606,007 S * | 12/2009 | Fontaine et al. | D12/564 |
| D609,162 S * | 2/2010 | Dixon et al. | D12/544 |
| 2006/0118222 A1 | 6/2006 | Ebiko | |
| 2006/0151078 A1 | 7/2006 | Colombo et al. | |

FOREIGN PATENT DOCUMENTS

| | | |
|---|---|---|
| JP | 7-186631 A | 7/1995 |
| JP | 8-025919 A | 1/1996 |
| JP | 2002283812 A | 10/2002 |
| JP | 2003-182315 A | 7/2003 |
| JP | 2006-510534 A | 3/2006 |
| JP | 2008-030605 A | 2/2008 |
| JP | 2008-044441 A | 2/2008 |
| WO | 2005/005170 A1 | 1/2005 |

OTHER PUBLICATIONS

Extended European Search Report issued in European Application No. 11830656 dated Aug. 20, 2014.

Communication from the Japanese Patent Office dated Nov. 4, 2014 in corresponding Japanese Application No. 2012-537716.

* cited by examiner

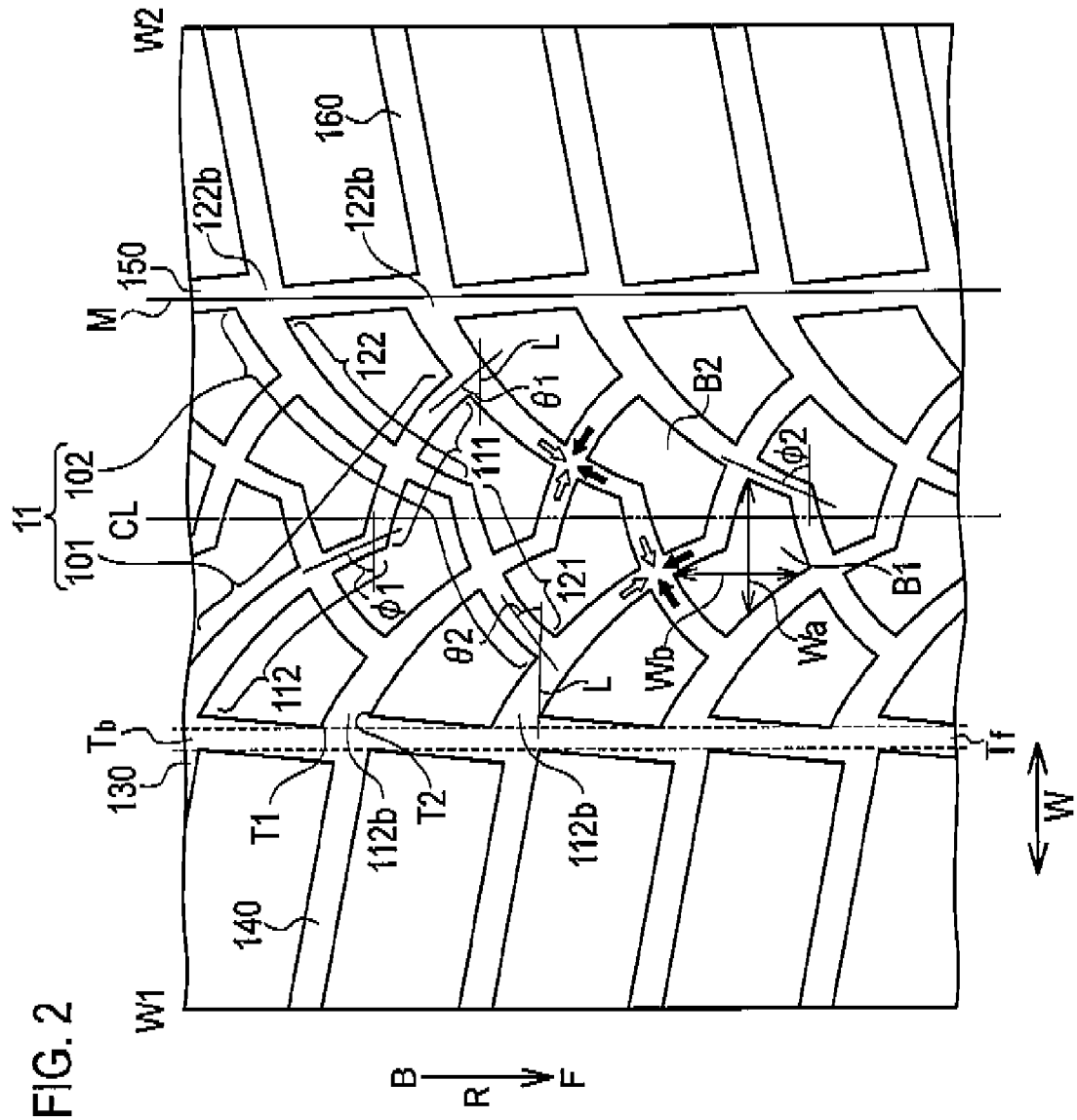

TIRE

TECHNICAL FIELD

The present invention relates to a tire suitable for use in icy or snowy road surface.

BACKGROUND ART

Conventionally, a variety of proposals have been made as to a tire improving a cruising performance on an icy or snowy road surface (a snowy road surface or an icy road surface). In order to enhance a cruising performance such as an acceleration performance at the time of startup on an icy or snowy road surface a braking performance at the time of stoppage, it is preferable to increase a component of a side groove along a tread widthwise direction (a so called lag groove) and to increase a percentage of a groove area in a ground surface (a negative rate).

However, if the component of the lag groove is increased too much in order to increase the negative rate, since a stability of block lowers, a driving stability in a dry road surface also lowers. On the other hand, if the content of the lag component is increased without increasing the negative rate, since a groove (a rib groove) component in a circumferential direction along a tire circumferential direction is decreased, a drainage performance also lowers.

In order to ensure compatibility between the cruising performance and the drainage performance in the icy or snowy road surface described above for example, there is proposed a tire in which a lag groove crossing in the tread widthwise direction is formed in a substantially V shape so as to be symmetrical with a tire equator line (refer to Patent Literature 1). According to this tire, the drainage performance is improved by means of a lag groove formed in a substantially V shape so as to be symmetrical with the tire equator line and a main groove that are formed in parallel to each other along the tire circumferential direction at a tread center part including the tire equator line.

CITATION LIST

Patent Literature

Patent Literature 1: International Publication No. WO2005/005170, FIG. 1

SUMMARY OF INVENTION

However, so far, the conventional tire has entailed the following problem. That is, while in the conventional tire, the drainage performance can be improved, a block surrounded by the main groove has a shape which is greater in length in the tire circumferential direction than in the tread widthwise direction. In addition, since a sipe along the tread widthwise direction is formed, there is a problem that rigidity of the tread center part lowers. The lowering of the rigidity of the tread center part leads to the lowering of traction at the time of cornering or at the time of fast cruising.

Therefore, a further modification is required to widely ensure compatibility between the cruising performance and the drainage performance in a variety of situations in icy or snowy road surface.

Accordingly, it is an object of the present invention to provide a tire enabling a cruising performance and a drainage performance in icy or snowy road surface to be compatible with each other at a high level.

To solve the above problem, the present invention is summarized as a tire comprising a plurality of inclined grooves (inclined grooves 11) which are inclined with respect to a tread widthwise direction line (tread widthwise direction line L) parallel to a tread widthwise direction and are disposed in a tread unit along a tire circumferential direction, and in which a rotational direction at a time of forward movement of a vehicle body is specified, wherein the inclined grooves have: a first inclined grooves (first inclined grooves 101, for example) crossing a tire equator line and extending to the outside in one tire widthwise direction as the first inclined grooves go from a foreside (foreside F in the rotational direction) to a backside (backside B in the rotational direction) in the rotational direction; and a plurality of second inclined grooves (second inclined grooves 102) respectively crossing the tire equator line and the first inclined grooves and extending to an outside in another tire widthwise direction as the second inclined grooves go from the foreside to the backside in the rotational direction, the first inclined grooves and the second inclined grooves respectively comprise: a foreside curved groove (foreside curved grooves 111, 121) positioned at the foreside in the rotational direction and are formed of curves overhanging from the foreside to the backside in the rotational direction, the foreside curved groove crossing the tread widthwise direction line at an acute angle; and a backside curved groove (backside curved grooves 112, 122) connected to an end portion at the backside in the rotational direction of the foreside curved groove and crossing the tread widthwise direction line at an angle ($\phi 1$, $\phi 2$) greater than a cross angle ($\theta 1$, $\theta 2$) between the foreside curved groove and the tread widthwise direction line, the plurality of second inclined grooves respectively comprise: a foreside second inclined groove (foreside second inclined groove 102a, for example); and a backside second inclined groove (backside second inclined groove 102b, for example) disposed at the backside in the rotational direction more significantly than the foreside second inclined groove and is adjacent to the foreside second inclined groove in the tire circumferential direction, the foreside curved groove of the first inclined groove and the backside curved groove of the foreside second inclined groove cross each other, and the backside curved groove of the first inclined groove and the foreside curved groove of the backside second inclined groove cross each other.

According to the present invention, since the first inclined grooves and the second inclined grooves are formed so as to extend to the outside in a tire widthwise direction as these grooves go from a foreside in a rotational direction (foreside F in the rotational direction) to a backside (backside B in the rotational direction), there can be enhanced an advantageous effect of discharging water on a road surface to the outside in the tire widthwise direction.

In addition, according to the present invention, a foreside curved groove is formed, whereby an edge effect at the time of acceleration or at the time of startup can be enhanced.

Further, the foreside curved grooves are positioned at the foreside in the rotational direction, and are constituted with curves overhanging from the foreside to the backside in the rotational direction. In addition, the foreside curved groove of the first inclined groove and the backside curved groove of the foreside second inclined groove on the foreside cross each other, and the backside curved groove of the first inclined groove and the foreside curved groove 121 of the backside second inclined groove on the backside cross each other. With these grooves, at a cross point, movements of snow in the grooves interfere with each other, a pressure associated with the snow in the grooves rises. In this manner, density of the snow in the grooves is increased, and a snow's shear force increases. Therefore, the cruising performance in icy or snowy road surface can be enhanced.

BRIEF DESCRIPTION OF DRAWINGS

FIG. 1 is an exploded view explaining a tread pattern of a pneumatic tire 1 according to a first embodiment.

[FIG. 2] FIG. 2 is an exploded view explaining the tread pattern of the pneumatic tire 1 according to the first embodiment.

DESCRIPTION OF EMBODIMENTS

Figure 1:
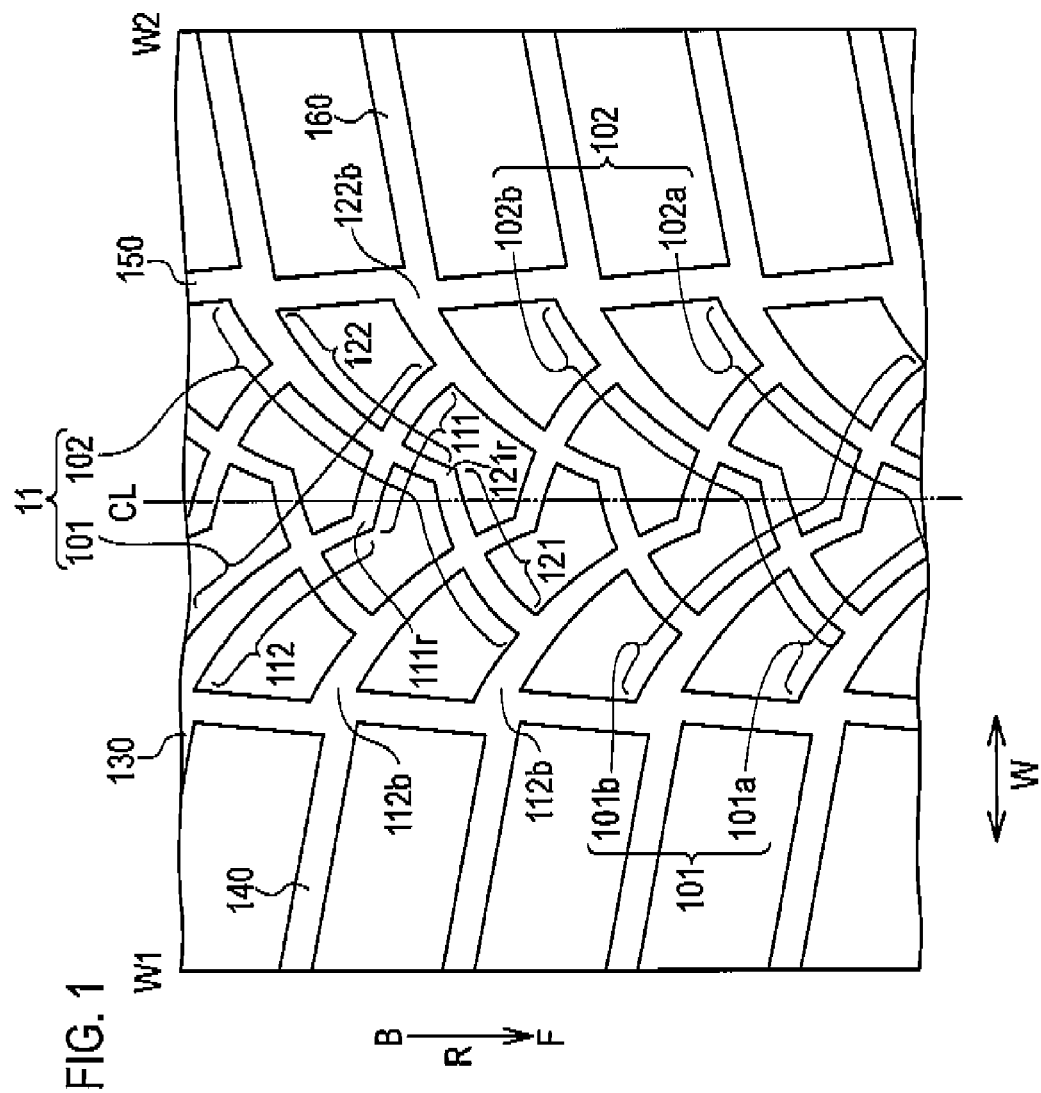
[FIG. 1]

Embodiments of a tire according to the present invention will be described with reference to the drawings. Specifically, (1) Description of Pneumatic Tire, (2) Functions and Advantageous Effects, and (3) Other Embodiments will be described.

In the following description of the drawings, same or similar constituent elements are designated by same or similar reference numerals. However, it should be kept in mind that the drawings are merely schematic, and rates or the like of the respective dimensions are different from real ones. Therefore, specific dimensions or the like should be determined in consideration of the following description. In addition, in among the respective drawings, portions different from each other in dimensional interrelationship or rate are included.

(1) Description of Pneumatic Tire

A structure of a pneumatic tire 1 according to the embodiments will be described with reference to the drawings. FIG. 1 and FIG. 2 are exploded views explaining a tread pattern of a pneumatic tire 1 according to a first embodiment. The pneumatic tire is a general radial tire provided with a bead unit, a carcass layer, a belt layer, and a tread unit (not shown). In the pneumatic tire 1, a rotational direction (R direction) at the time of forward movement of a vehicle body is specified.

The pneumatic tire 1 is provided with a plurality of inclined grooves 11 inclined with respect to a phantom line along a tread widthwise W direction (tread widthwise direction line L).

The inclined groove 11 has a plurality of first inclined grooves 101 and a plurality of second inclined grooves 102. The first inclined groove 101 crosses a tire equator line CL, and extends to one outside W1 in a tire widthwise direction as the groove goes from the foreside F in the rotational direction to the backside B in the rotational direction. The second inclined groove 102 crosses the tire equator line CL and the first inclined groove 101, and extends to the other outside W2 in the tire widthwise direction as the groove goes from the foreside F in the rotational direction to the backside B in the rotational direction.

The first inclined groove 101 has a forward first inclined groove 101a and a backward first inclined groove 101b. The forward first inclined groove 101a, and the backward first inclined groove 101b, are adjacent to each other in the tire circumferential direction. The forward first inclined groove 101a, is positioned at the foreside F in the rotational direction more significantly than the backward first inclined groove 101b. The backward first inclined groove 101b, is positioned at the backside B in the rotational direction more significantly than the forward first inclined groove 101a.

The second inclined groove 102 has a forward second inclined groove 102a, and a backward second inclined groove 102b. The forward second inclined groove 102a, and the backward second inclined groove 102b, are adjacent to each other in the tire circumferential direction. The forward second inclined groove 102a, is positioned at the foreside F in the rotational direction more significantly than the backward second inclined groove 102b. The backward second inclined groove 102b, is positioned at the backside B in the rotational direction more significantly than the forward second inclined groove 102a.

The first inclined groove 101 and the second inclined groove 102 both are formed so as to cross the tire equator line CL. The shape of the first inclined groove 101 and the shape of the second inclined groove 102 are respectively linearly symmetrical with each other with respect to the tire equator line CL. The first inclined groove 101 and the second inclined groove 102, each of which has the shape of linear symmetry with respect to the tire equator line CL, are formed so as to be displaced forward and backward in the tire circumferential direction in the tread unit.

The first inclined groove 101 has a foreside curved groove 111 that is positioned at the foreside F in the rotational direction and a backside curved groove 112 that is positioned at the backside B in the rotational direction. The foreside curved groove 111 and the backside curved groove 112 are connected to each other. The first inclined groove 101 bends at this coupling portion.

Like the first inclined groove 101, the second inclined groove 102 also has a foreside curved groove 121 that is positioned at the foreside F in the rotational direction and a backside curved groove 122 that is positioned at the backside B in the rotational direction. The foreside curved groove 121 and the backside curved groove 122 are connected to each other. The second inclined groove 102 bends at this coupling portion.

In addition, the foreside curved grooves 111 and 121 and the backside curved grooves 112 and 122 both are formed of curves overhanging from the foreside F in the rotational direction to the backside B in the rotational direction.

In the embodiment shown in FIG. 1 and FIG. 2, the foreside curved grooves 111 and 121 are formed so that their lengths that over the tire circumferential direction are respectively smaller than those of the backside curved grooves 112 and 122. The foreside curved grooves 111 and 121 cross the line L in the tread widthwise direction at an acute angle (angle θ1 or θ2).

The backside curved grooves 112 and 122 are connected to end portions 111r, and 121r, at the backside B in the rotational direction of the foreside curved grooves 111 and 121. The backside curved grooves 112 and 122 cross the line L in the tread widthwise direction at angle φ1 or φ2 that is greater than the cross angle θ1 or θ2 between the foreside curved grooves 111 and 121 and the tread widthwise direction L. Here, the ranges of angles of θ1 and θ2 and φ1 and φ2 can be set at the values as shown below. 30, degrees<θ1, θ2<80, degrees, 60, degrees<φ1, and φ2<100, degrees In the embodiment shown in FIG. 1 and FIG. 2, the foreside curved grooves 111 and 121 are formed so as to extend in the tread widthwise direction, and the backside curved grooves 112 and 122 are formed so as to extend in the tire circumferential direction.

In the embodiment, the foreside curved groove 111 of the first inclined groove 101 and the backside curved groove 122 of the second inclined groove 102 cross each other. The backside curved groove 112 of the first inclined groove 101 and the foreside curved groove 121 of the second inclined groove 102 cross each other. Specifically, the foreside curved groove 111 of the first inclined groove 101 and the backside curved groove 122 of the foreside second inclined groove 102a, cross each other, and the backside curved groove 112 of the first inclined groove 101 and the foreside curved groove 121 of the backside second inclined groove 102b, cross each other. Similarly, the foreside curved groove 121 of the second inclined groove 102 and the backside curved groove 112 of the foreside first inclined groove 101a cross each other, and the backside curved groove 122 of the second inclined groove 102 and the foreside curved groove 111 of the backside first inclined groove 101b, cross each other.

The foreside curved groove 111 of the first inclined groove 101 crosses the tire equator line CL. The foreside curved groove 121 of the second inclined groove 102 crosses the tire equator line CL.

In the tire widthwise direction, circumferential grooves 130 and 150 extending along the tire circumferential direction are respectively formed at the outside of the first inclined groove 101 and the second inclined groove 102.

The circumferential grooves 130 and 150 are formed in a zigzag shape with respect to the line M in the tire circumferential direction parallel to a tire circumferential direction.

In the embodiment shown in FIG. 1 and FIG. 2, when the tread unit is expanded all over the tire circumferential direction, the circumferential grooves 130 and 150 are grooves (so called see-through grooves) in which from arbitrary one end (an end portion Tf of the foreside F in the rotational direction in FIG. 2), the other end (an end portion Tb of the backside B in the rotational direction in FIG. 2) can be seen.

The backside curved groove 112 is in communication with the circumferential groove 130. The backside curved groove 122 is in communication with the circumferential groove 150.

At a communication portion between the backside curved groove 112 and the circumferential groove 130, an end portion T2 of a wall surface of the foreside F in the rotational direction of the backside curved groove 112 is positioned in a location closer to the tire equator line CL than an end portion T1 of the wall surface of the backside B in the rotational direction of the backside curved groove 112. Similarly, at a communication portion between the backside curved groove 122 and the circumferential groove 150, an end portion of the wall surface of the foreside F in the rotational direction of the backside curved groove 122 is positioned in a location closer to the tire equator line CL than an end portion of the wall surface of the backside B in the rotational direction of the backside curved groove 122. It is to be noted that the end portion of the wall surface is an end portion in the tread widthwise direction.

In the tire widthwise direction W, a plurality of side grooves 140 extending in the tread widthwise direction are formed at the outside W1 of the circumferential groove 130. In the tire widthwise direction W, a plurality of side grooves 160 extending in the tread widthwise direction are formed at the outside W2 of the circumferential groove 150. An end portion 112b, of the outside in the tire widthwise direction of the backside curved groove 112 couples with the side groove 140. In addition, an end portion 122b, at the outside in the tire widthwise direction of the backside curved groove 122 couples with the side groove 160.

The blocks B1 and B2 that are formed by being defined in the first inclined groove 101 and the second inclined groove 102 has an elongated portion in which a length Wa in he tread widthwise direction is greater than a length Wb in the tire circumferential direction. At the elongated portion, a thin groove (referred to as a sipe) is formed, although not shown. Here, the thin groove is referred to as a groove such that wall parts forming the thin groove are brought into contact with each other by means of a grounding pressure exerted when the pneumatic tire 1 is grounded.

(2) Functions and Advantageous Effects

In the pneumatic tire 1, the first inclined groove 101 and the second inclined groove 102 are formed so as to extend to the outside in the tire widthwise direction as these grooves go from the foreside F in the rotational direction to the backside B in the rotational direction. Thus, an advantageous effect of discharging the water on a road surface to the outside in the tire widthwise direction can be enhanced.

In the embodiment shown in FIG. 1 and FIG. 2, the foreside curved grooves 111 and 121 are formed so as to extend in the tread widthwise direction. Thus, the foreside curved grooves 111 and 121 can contribute to an edge effect at the time of acceleration or at the time of startup. The backside curved grooves 112 and 122 are formed so as to extend in the tire circumferential direction. Therefore, the backside curved grooves 112 and 122 can contribute to drainage property.

In the embodiment, the first inclined groove 101 and the second inclined groove 102, each of which has the shape of linear symmetry with respect to the tire equator line CL, are formed so as to be displaced forward and backward in the tire circumferential direction in the tread unit. In this manner, a change of a negative rate on the tread widthwise direction line exerted by tire rolling can be reduced, and tire noise exerted by edging can be reduced.

In the embodiment, the foreside curved groove 111 of the first inclined groove 101 and the backside curved groove 122 of the foreside second inclined groove 102a, cross each other, and the backside curved groove 112 of the first inclined groove 101 and the foreside curved groove 121 of the backside second inclined groove 102b, cross each other. Similarly, the foreside curved groove 121 of the second inclined groove 102 and the backside curved groove 112 of the foreside first inclined groove 101a, cross each other, and the backside curved groove 122 of the second inclined groove 102 and the foreside curved groove 111 of the backside first inclined groove 101b, cross each other. In addition, the foreside curved groove 111 of the first inclined groove 101 crosses the tire equator line CL. The foreside curved groove 121 of the second inclined groove 102 crosses the tire equator line CL.

In this manner, at a cross portion, movements of snow in the grooves interfere with each other, and a pressure associated with the snow in the grooves rises. For example, at the time of acceleration, at a cross portion of the grooves, the snow in the grooves moves in the direction indicated by the filled arrow, and its related movements interfere with each other, whereby the pressure associated with the snow in the grooves rises. In this manner, density of the snow in the grooves is enhanced, and a snow's shear force increases. In addition, at the time of braking, at the cross portion, the snow in the grooves moves in the direction indicated by the open arrow, and its related movements interfere with each other, whereby the pressure associated with the snow in the grooves rises. Therefore, the braking performance and the acceleration performance in icy or snowy road surface can be enhanced.

Here, the ranges of the angles of θ1, θ2, φ1, and φ2 can be set at the values shown below. 30, degrees<θ1, θ2<80, degrees, 60, degrees<φ1, and φ2<100, degrees. In particular, if the cross angles θ1 and θ2 between the foreside curved grooves 111 and 121 and the line L in the tread widthwise direction, are set to be 30, degrees<θ1 and θ2<50, degrees, a good edge effect can be obtained. In addition, the cross angles φ1 and φ2 between the backside curved grooves 112 and 122 and the line L in the tread widthwise direction are set to be 70, degrees<φ1 and φ2<90, degrees, a good drainage property can be obtained.

In addition, in a case where the cross angles θ1 and θ2 between the foreside curved grooves 111 and 121 and the line L in the tread widthwise direction are set to be shallow, the snow entering the foreside curved grooves 111 and 121 is hardly released. Thus, the snow's shear force can be further increased. Therefore, the cruising performance in icy or snowy road surface (in particular, steering wheel handling performance) can be enhanced. In this case, it is preferable that a relationship between the cross angles of θ1 and θ2 meet θ1 and θ2<OO degrees.

At the outside in the tire widthwise direction, there are formed the circumferential grooves 130 and 150 extending along the tire circumferential direction and having a zigzag shape with respect to the line M in the tire circumferential direction parallel to a tire circumferential direction. In the embodiment, at the communication portion between the backside curved groove 112 and the circumferential groove 130, the end portion T2 of the wall surface of the foreside F in the rotational direction of the backside curved groove 112 is positioned in a location closer to the tire equation line CL than the end portion T1 of the wall surface of the backside B in the rotational direction of the backside curved groove 112. Similarly, at the communication portion between the backside curved groove 122 and the circumferential groove 150, an end portion of the wall surface of the foreside F in the rotational direction of the backside curved groove 122 is positioned in a location closer to the tire equation line CL than an end portion of the wall surface of the backside B in the rotational direction of the backside curved groove 122.

By having such shape, the snow in the grooves is easily caught in the wall surface, and the snow in the grooves can be effectively compressed by means of rolling. Therefore, the snow's shear force can be effectively generated. In addition, since the circumferential grooves 130 and 150 are so called see-through grooves, these grooves have an edge effect, and can enhance a snow cruising performance and a drainage performance.

The blocks B1 and B2 that can be formed after defined into the first inclined groove 101 and the second inclined groove 102 has an elongated portion in which the length Wa in the tread widthwise direction is greater than the length Wb in the tire circumferential direction. At the elongated portion, a thin groove (referred to as a sipe) is formed, although not shown. In this manner, since an elongated groove that is long in the tread widthwise direction is formed in the blocks B1 and B2, an edge effect can be enhanced.

(3) Other Embodiments

As described above, while the contents of the present invention were disclosed through the embodiments of the present invention, it should not be understood that the statements and drawings forming a part of this disclosure limit the present invention. From this disclosure, a variety of alternative embodiments and examples would be self-explanatory to one skilled in the art. For example, the embodiments of the present invention can be modified as follows.

For example, while in FIG. 1, it is shown that the angles θ1 and θ2 are equal to each other, as long as the angle relationship described above is met, there does not always need to be θ1=θ2. As is the case with a relationship between the angles of φ1 and φ2 as well, as long as the angle relationship described above is met, there does not always need to be φ1=φ2.

While, in the embodiment shown in FIG. 1, the circumferential groove extending along the tire circumferential direction is formed at each of one outside W1 in the tire widthwise direction and the other outside W2 in the tire widthwise direction, the circumferential groove may be formed at only one side.

While, in the embodiment shown in FIG. 1, the rotational direction (R direction) at the time of forward movement of a vehicle body was specified, the rotational direction at the time of forward movement of the vehicle body does not always need to be specified. One direction parallel to a tire circumferential direction is a first direction, and the other direction parallel to a tire circumferential direction is a second direction. The second direction is a direction opposite to the first direction.

In a case where the first direction at the time of forward movement of the vehicle body is not specified, it may be that the tire is provided with a plurality of inclined grooves that are inclined with respect to the tread widthwise direction line parallel to a tread widthwise direction, and are disposed in a tread unit along the tire circumferential direction, the inclined grooves have: first inclined grooves crossing the tire equation line and extending to the outside in one wire widthwise direction as these grooves go from the foreside to the backside in the first direction; and a plurality of second inclined grooves respectively crossing the tire equation line and the first inclined grooves and extending to the outside in the other tore widthwise direction as these grooves go from the foreside to the backside in the first direction, the first inclined grooves and the second inclined grooves are formed of: foreside curved grooves that are positioned at the foreside in the first direction and are formed of curves overhanging from the foreside to the backside in the first direction, the foreside curved grooves crossing the tread widthwise direction line at an acute angle; and backside curved grooves connected to an end portion at the backside in the first direction of the foreside curved groove and crossing the tread widthwise direction line at an angle that is greater than the cross angle between the foreside curved groove and the tread widthwise direction line, the plurality of second inclined grooves have foreside second inclined grooves and backside second inclined grooves that are disposed at the backside in the first direction more significantly than the foreside second inclined grooves, and are adjacent to the foreside second inclined grooves in the tire circumferential direction, the foreside curved grooves of the first inclined grooves and the backside curved grooves of the foreside second inclined grooves cross each other, and the backside curved grooves of the first inclined grooves and the foreside curved grooves of the backside second inclined grooves cross each other. As long as the tire mentioned above is mounted on the vehicle body so that the rotational direction at the time of forward movement of the vehicle body is coincident with the first direction, there can be attained functions and advantageous effects similar to those of the embodiment shown in FIG. 1. In order to prevent a mistaken mounting direction, it is preferable that the rotational direction at the time of forward movement of the vehicle body be specified.

Thus, of course, the present invention includes a variety of embodiments or the like described herein. Therefore, the technical scope of the present invention is defined only by the specified matter of the invention associated with reasonable scope of claims from the foregoing description.

All the contents of Japanese Patent Application No. 2010-225771 (filed on Oct. 5, 2010) are incorporated therein by reference.

[Industrial Applicability]

According to the present invention, there can be provided a tire enabling a cruising performance and a drainage performance in icy or snowy road surface to be compatible with each other at a high level.

The invention claimed is:

1. A tire comprising a plurality of inclined grooves which are inclined with respect to a tread widthwise direction line parallel to a tread widthwise direction and are disposed in a tread unit along a tire circumferential direction, and in which a rotational direction at a time of forward movement of a vehicle body is specified, wherein
the inclined grooves have:
a plurality of first inclined grooves crossing a tire equator line and extending to the outside in one tire widthwise direction as the first inclined grooves go from a foreside to a backside in the rotational direction; and
a plurality of second inclined grooves respectively crossing the tire equator line and the first inclined grooves and extending to an outside in another tire widthwise direction as the second inclined grooves go from the foreside to the backside in the rotational direction,
the first inclined grooves and the second inclined grooves respectively comprise:
a foreside curved groove positioned at the foreside in the rotational direction and formed of curve overhanging from the foreside to the backside in the rotational direction, the foreside curved groove crossing the tread widthwise direction line at an acute angle; and
a backside curved groove formed of a curve overhanging from the foreside to the backside in the rotaional direction and connected to an end portion at the backside in the rotational direction of the foreside curved groove and crossing the tread widhthwise direction line at an anle greater than a cross angle between the foreside curved groove and the tread widthwise direction line,
the plurality of second inclined grooves respectively comprise:
a foreside second inclined groove; and
a backside second inclined groove that is disposed at the backside in the rotational direction more significantly than the foreside second inclined groove and is adjacent to the foreside second inclined groove in the tire circumferential direction,
the foreside curved groove of the first inclined groove and the backside curved groove of the foreside second inclined groove cross each other, and
the backside curved groove of the first inclined groove and the foreside curved groove of the backside second inclined groove cross each other.

2. The tire according to claim 1, wherein the first inclined groove and the second inclined groove cross a tire equator line in the foreside curved groove.

3. The tire according to claim 1, wherein the foreside curved groove are shorter than the backside curved groove.

4. The tire according to claim 1, wherein a circumferential groove extending along the tire circumferential direction is provided at least at one outside in the tire widthwise direction,
the circumferential groove is a groove formed in a zigzag shape with respect to a tire circumferential direction line parallel to a tire circumferential direction, and one end of circumferential groove can be seen from an arbitrary end if the tread unit is expanded all over the tire circumferential direction, and
the backside curved groove communicates with the circumferential groove.

5. The tire according to claim 4, wherein at a communication portion between the backside curved groove and the circumferential groove, an end portion of a wall surface of a foreside in a rotational direction of the backside curved groove is positioned in a location closer to a tire equator line than an end portion of a wall surface of a backside in a rotational direction of the backside curved groove.

6. The tire according to claim 4, wherein a side groove extending in a tread widthwise direction is formed at an outside in the tire widthwise direction more significantly than the circumferential groove, and
an end portion at an outside in the tire widthwise direction of the backside curved groove is connected to the side groove.

7. The tire according to claim 1, wherein a block formed after defined in the first inclined groove and the second inclined groove has an elongated portion in which a length in a tread widthwise direction is greater than a length in the tire circumferential direction, and
in the elongated portion, there is formed a thin groove with which a groove wall comes into contact when the tread unit abuts against a road surface.

8. The tire according to claim 1, wherein an end portion at the foreside in the rotational direction of the one of the inclined grooves communicates with another of the inclined grooves.

* * * * *